(12) United States Patent
Kim et al.

(10) Patent No.: US 11,537,882 B2
(45) Date of Patent: Dec. 27, 2022

(54) MACHINE LEARNING APPARATUS AND METHOD FOR OBJECT DETECTION

(71) Applicant: SAMSUNG SDS CO., LTD., Seoul (KR)

(72) Inventors: Ji-Hoon Kim, Seoul (KR); Young-Joon Choi, Seoul (KR); Jong-Won Choi, Seoul (KR); Byoung-Jip Kim, Seoul (KR); Seong-Won Bak, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 655 days.

(21) Appl. No.: 16/665,889

(22) Filed: Oct. 28, 2019

(65) Prior Publication Data

US 2021/0125056 A1 Apr. 29, 2021

(30) Foreign Application Priority Data

Oct. 28, 2019 (KR) ........................ 10-2019-0134358

(51) Int. Cl.
*G06N 3/08* (2006.01)
*G06N 3/04* (2006.01)
*G06V 10/82* (2022.01)
*G06K 9/62* (2022.01)

(52) U.S. Cl.
CPC ............. *G06N 3/08* (2013.01); *G06K 9/6256* (2013.01); *G06N 3/04* (2013.01); *G06V 10/82* (2022.01)

(58) Field of Classification Search
None
See application file for complete search history.

(56) References Cited

U.S. PATENT DOCUMENTS

2021/0271809 A1\* 9/2021 Huang ..................... G06N 5/04

FOREIGN PATENT DOCUMENTS

KR 10-2019-0080904 A1 7/2019

\* cited by examiner

*Primary Examiner* — Leon Flores
(74) *Attorney, Agent, or Firm* — The PL Law Group, PLLC (57) ABSTRACT

A machine learning apparatus according to an embodiment includes a feature extractor configured to extract features from an object region of an image, a label processor configured to create sentence label embeddings from a sentence label corresponding to the object region, a first training data creator to extract first sub-features from a plurality of first sub-regions created by partitioning the object region, add the sentence label embeddings to the extracted first sub-features, and add the first sub-features added with the sentence label embeddings to the features of the object region, a second training data creator to extract a plurality of second sub-regions along a bounding surface of the object region, create an attention matrix from the second sub-regions, and create a training data by applying the attention matrix to the features of the object region, and a trainer to train an object detection model using the training data.

18 Claims, 10 Drawing Sheets

FIG. 10

MACHINE LEARNING APPARATUS AND METHOD FOR OBJECT DETECTION

CROSS REFERENCE TO RELATED APPLICATIONS AND CLAIM OF PRIORITY

This application claims the benefit of Korean Patent Application No. 10-2019-0134358 filed on Oct. 28, 2019 in the Korean Intellectual Property Office, the disclosure of which is incorporated herein by reference in its entirety.

TECHNICAL FIELD

The disclosed embodiments relate to a technique of detecting an object from an image on the basis of machine learning.

BACKGROUND ART

Object detection is an automated technique of distinguishing and identifying an interested object from the background in an image. Recently, performance of the object detection is continuously improved as machine learning, particularly, deep learning, is applied to the object detection.

As one of the methods for enhancing the accuracy and efficiency of the object detection, a method using a label of a text form attached to an image is used. For example, an object can be detected more effectively in an image by adding a label "bird" to a picture in which a bird is flapping. However, conventional object detection methods using text labeling are limited in that only labels of a word form are considered, and labels of a sentence form cannot be utilized.

SUMMARY

The disclosed embodiments are for providing a technical means for training a detection model by adding label information configured in a sentence form as a feature value of an image, and detecting an interested object from the image using the trained detection model.

To accomplish the above object, according to one aspect of the present invention, there is provided a machine learning apparatus comprising: a feature extractor configured to extract features from an object region of an image; a label processor configured to create sentence label embeddings from a sentence label corresponding to the object region; a first training data creator configured to extract first sub-features from a plurality of first sub-regions created by partitioning the object region, add the sentence label embeddings to the extracted first sub-features, and add the first sub-features added with the sentence label embeddings to the features of the object region; a second training data creator configured to extract a plurality of second sub-regions along a bounding surface of the object region, create an attention matrix from the second sub-regions, and create a training data by applying the attention matrix to the features of the object region; and a trainer configured to train an object detection model using the training data.

The first training data creator may be further configured to extract the first sub-features by inputting the plurality of first sub-regions into a convolution layer.

The first training data creator may be further configured to input the sentence label embeddings into the convolution layer to convert the sentence label embeddings into a size the same as that of the first sub-features, and add the converted sentence label embeddings to the first sub-features.

The first training data creator may be further configured to input the first sub-features added with the sentence label embeddings into a deconvolution layer to convert the first sub-features into a size the same as that of the features of the object region, and add the converted first sub-features to the features of the object region as additional channels.

The second training data creator may be further configured to input the second sub-regions into a convolution layer to create second sub-features, and create a second sub-feature matrix, which is a two-dimensional matrix having the created second sub-features as a row.

The second training data creator may be further configured to input the sentence label embeddings into the convolution layer to convert the sentence label embeddings into a size the same as that of the second sub-features, convert the converted sentence label embeddings into an one-dimensional vector, and create an attention weight vector through an inner product between the one-dimensional vector and the second sub-feature matrix.

The second training data creator may be further configured to create the attention matrix by padding the attention weight vector in an outer area of the two-dimensional matrix, each element of which has a value of 1, considering extraction locations of the second sub-regions.

The attention matrix may be created to have a size the same as that of each channel included in the features of the object region. The trainer may be further configured to train the object detection model using a loss function considering an Intersection Over Union (IOU) and a distance between the training data, which is created from an object region predicted from a training target image, and a ground truth data (GT).

According to another embodiment, there is provided a machine learning method comprising: a step of extracting features from an object region of an image; a step of creating sentence label embeddings from a sentence label corresponding to the object region; a first training data creation step of extracting first sub-features from a plurality of first sub-regions created by partitioning the object region, adding the sentence label embeddings to the extracted first sub-features, and adding the first sub-features added with the sentence label embeddings to the features of the object region; a second training data creation step of extracting a plurality of second sub-regions along a bounding surface of the object region, creating an attention matrix from the second sub-regions, and creating a training data by applying the attention matrix to the features of the object region; and a step of training an object detection model using the training data.

The first training data creation step may extract the first sub-features by inputting the plurality of first sub-regions into a convolution layer.

The first training data creation step may input the sentence label embeddings into the convolution layer to convert the sentence label embeddings into a size the same as that of the first sub-features, and add the converted sentence label embeddings to the first sub-features.

The first training data creation step may input the first sub-features added with the sentence label embeddings into a deconvolution layer to convert the first sub-features into a size the same as that of the features of the object region, and add the converted first sub-features to the features of the object region as additional channels.

The second training data creation step may input the second sub-regions into a convolution layer to create second sub-features, and create a second sub-feature matrix, which is a two-dimensional matrix having the created second sub-features as a row.

The second training data creation step may input the sentence label embeddings into the convolution layer to convert the sentence label embeddings into a size the same as that of the second sub-features, convert the converted sentence label embeddings into an one-dimensional vector, and create an attention weight vector through an inner product between the one-dimensional vector and the second sub-feature matrix.

The second training data creation step may create the attention matrix by padding the attention weight vector in an outer area of the two-dimensional matrix, each element of which has a value of 1, considering extraction locations of the second sub-regions.

The attention matrix may be created to have a size the same as that of each channel included in the features of the object region.

The training step may train the object detection model using a loss function considering an Intersection Over Union (IOU) and a distance between the training data, which is created from an object region predicted from a training target image, and a ground truth data (GT).

According to the exemplary embodiments, even when a label of an image is configured in the form of a sentence, a detection model may be trained by using all the relations between the sentences included in the label in the training process. Accordingly, compared with a conventional detection model using a label of a word form, accuracy of object detection can be enhanced.

In addition, according to the exemplary embodiments, accuracy of training can be enhanced by embedding information on a sentence label in the features of an object region and applying information on the outer shape of the object region through an attention matrix.

DETAILED DESCRIPTION

Hereafter, specific embodiments of the present invention will be described with reference to the accompanying drawings. The detailed description is provided below to help comprehensive understanding of the methods, apparatuses and/or systems described in this specification. However, these are only an example, and the present invention is not limited thereto.

In describing the embodiments of the present invention, when it is determined that specific description of known techniques related to the present invention unnecessarily blurs the gist of the present invention, the detailed description will be omitted. In addition, the terms described below are terms defined considering the functions of the present invention, and these may vary according to user, operator's intention, custom or the like. Therefore, definitions thereof should be determined on the basis of the full text of the specification. The terms used in the detailed description are only for describing the embodiments of the present invention and should not be restrictive. Unless clearly used otherwise, expressions of singular forms include meanings of plural forms. In the description, expressions such as "include", "provide" and the like are for indicating certain features, numerals, steps, operations, components, some of these, or a combination thereof, and they should not be interpreted to preclude the presence or possibility of one or more other features, numerals, steps, operations, components, some of these, or a combination thereof, in addition to those described above.

Figure 1:
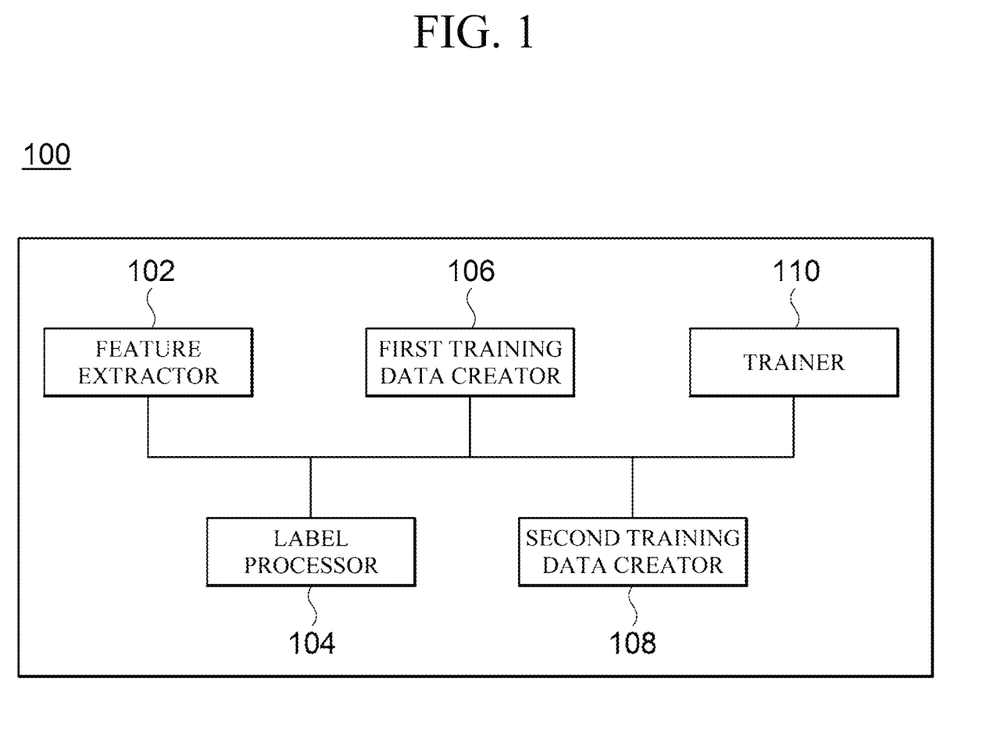
FIG. 1 is a block diagram showing a machine learning apparatus for objection detection according to an embodiment.

FIG. 1 is a block diagram showing a machine learning apparatus 100 for objection detection according to an embodiment. The machine learning apparatus 100 according to an embodiment is an apparatus for training an object detection model for detecting one or more objects from an image. As shown in the figure, the machine learning apparatus 100 according to an embodiment includes a feature extractor 102, a label processor 104, a first training data creation model 106, a second training data creator 108, and a trainer 110.

The feature extractor 102 extracts features from an object region of a training target image.

Figure 2:
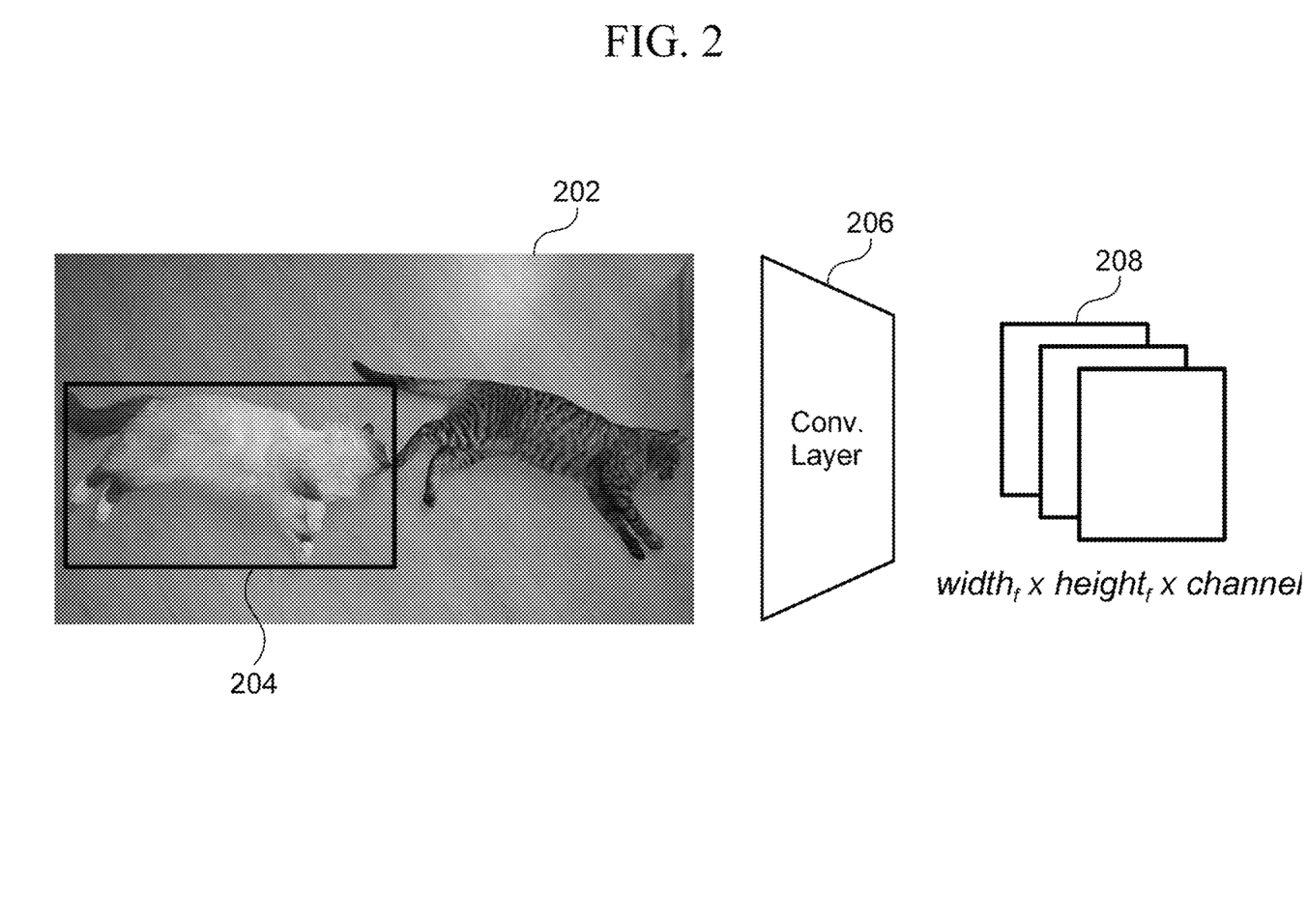
FIG. 2 is a view showing an example of extracting a feature from an object region of a training target image by a feature extractor according to an embodiment.

FIG. 2 is a view showing an example of extracting a feature from an object region of a training target image by the feature extractor 102 according to an embodiment. As shown in the figure, a training target image 202 may include one or more objects. The example in the figure shows that a white cat on the left side in the training target image 202 is specified as an object. An individual training target image may include one or more objects. As shown in the figure, the training target image 202 may have an object region 204 in the form of a bounding box to express the locations of the objects included in the image. In an embodiment, the feature extractor 102 may input the pixels included in the object region 204 into a convolution layer 206 and extract features 208 therefrom. At this point, the size of the extracted features 208 may be determined as (width$_f$*height$_f$*channel). At this point, width$_f$ and height$_f$ denote the matrix size of each channel configuring the features 208, and 'channel' denotes the number of channels configuring the features 208. For example, when the training target image 202 is a three-channel image including R, G and B, the number of channels of the features 208 extracted from the image may be three. However, the disclosed embodiments are not limited only to a specific number of channels.

Next, the label processor 104 creates sentence label embeddings from a sentence label corresponding to the object region of the training target image.

In the disclosed embodiments, each object of the training target image 202 is configured to have a label configured in the form of a sentence (sentence label). For example, a sentence label as shown below may be added to the object region 202 of FIG. 2.

"White cat lying on the left side of the floor"

The label processor 104 may create a vector for each word included in the sentence label labeled in correspondence to the object region 204 of the training target image 202, and create sentence label embeddings by combining the vectors. For example, the label processor 104 may create vectors corresponding to "left", "on the floor", "lying", "white" and "cat" respectively, and create sentence label embeddings by combining the vectors. As a method of creating the vectors from text such as words or the like, one or more of various algorithms used in this technical field may be applied.

Next, the first training data creator 106 partitions the object region 204 into a plurality of first sub-regions and extracts first sub-features from the first sub-regions. In addition, the first training data creator 106 adds the sentence label embeddings created by the label processor to the extracted first sub-features and adds the first sub-features added with the sentence label embeddings to the feature of the object region 204. This will be described below in more detail.

Figure 3:
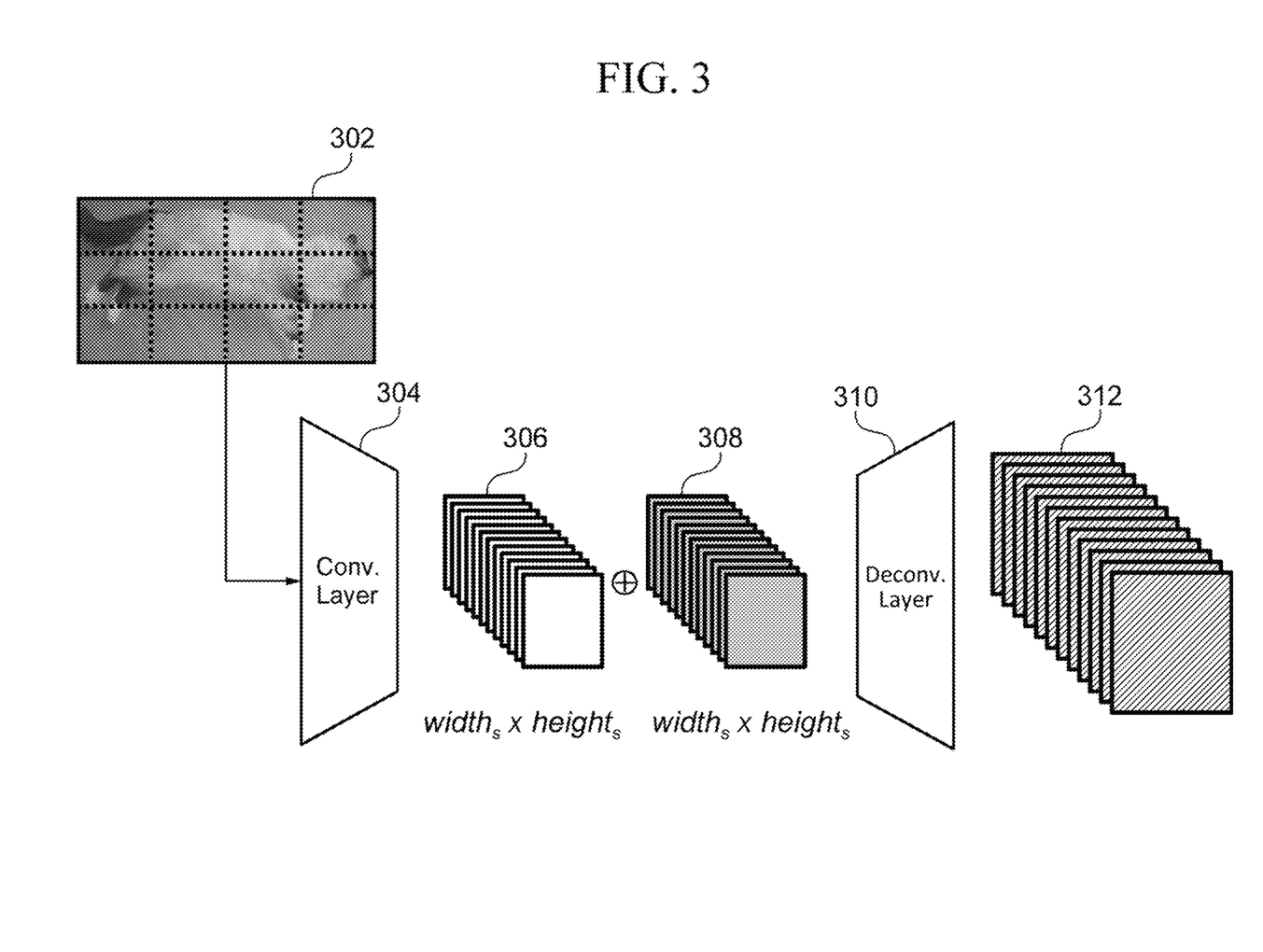
FIGS. 3 and 4 are views showing an example of processing an object region by a first training data creator according to an embodiment.
Figure 4:
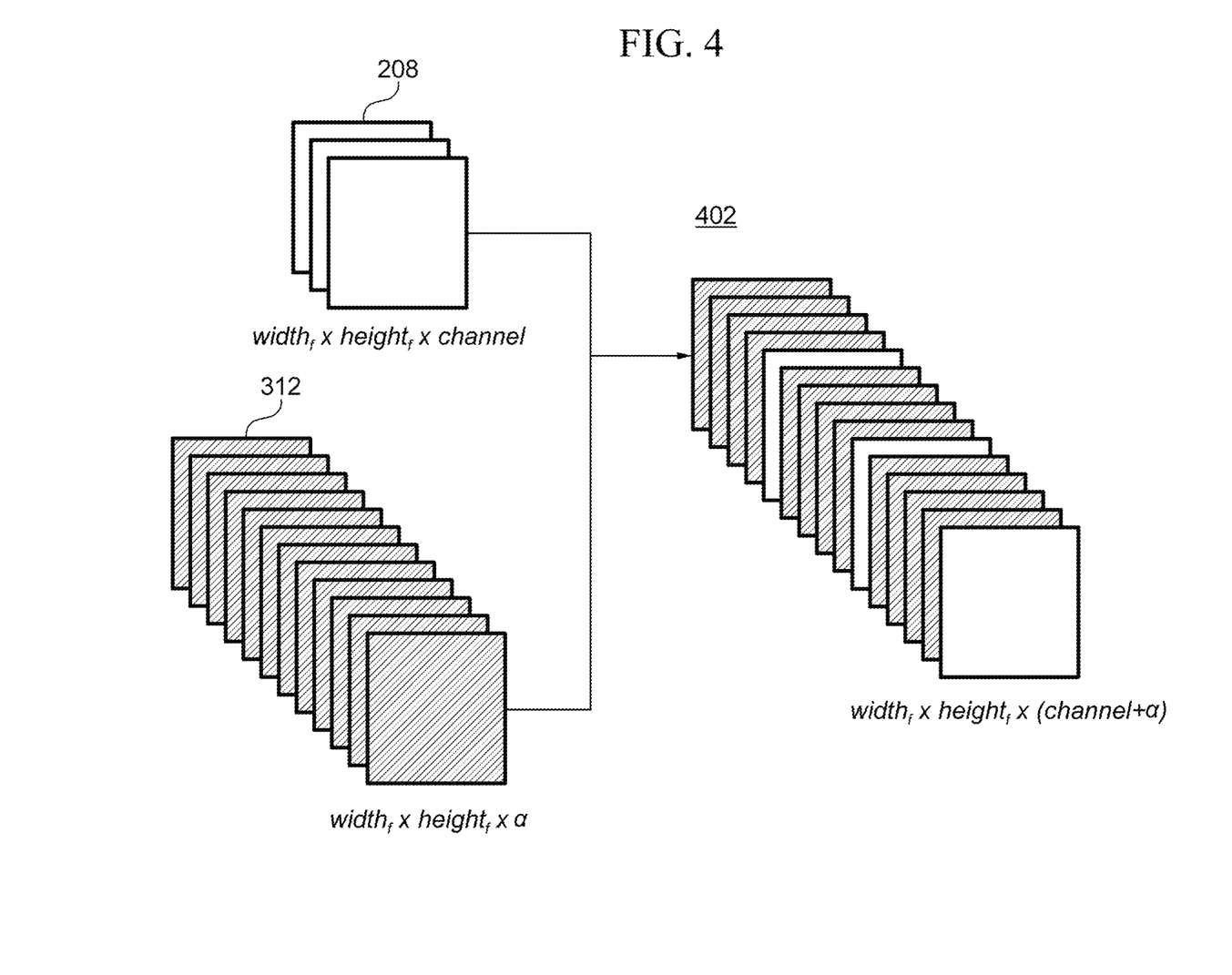

FIGS. 3 and 4 are views showing an example of processing the object region 204 by the first training data creator 106 according to an embodiment. First, as shown in FIG. 3, the first training data creator 106 partitions the object region 204 into a plurality of first sub-regions 302. Although an example of partitioning the object region 204 into twelve first sub-regions 302 is shown in the figure, the disclosed embodiments are not limited to the number of sub-regions.

Then, the first training data creator 106 extracts first sub-features from the first sub-regions 302. In an embodiment, the first training data creator 106 may extract the first sib-features by applying one layer convolution (pooling-BN-activation) to the plurality of first sub-regions 302. At this point, the size of each channel configuring the extracted first sub-feature may be defined as ($width_s$*$height_s$).

Next, the first training data creator 106 converts the sentence label embeddings to a size ($width_s$*$height_s$) the same as the channel size of the first sub-feature by applying one layer convolution to the sentence label embeddings created by the label processor 104. Then, the first training data creator 106 adds the sentence label embeddings 308 converted through the above process to each channel of the first sub-feature. For example, the first training data creator 106 may add the sentence label embeddings 308 to each channel of the first sub-feature by adding the converted sentence label embeddings 308 and the values configuring each channel of the first sub-feature.

Next, the first training data creator 106 inputs the first sub-features added with the sentence label embeddings 308 into a deconvolution layer 310 to convert the first sub-features into a size the same as that of the features of the object region. Finally, the first training data creator 106 may create a first training data 402 by adding the first sub-features 312 passing through the deconvolution layer 310 to the features 208 of the object region as additional channels. As shown in FIG. 4, the first training data creator 106 may add the first sub-features 312, as additional channels, to the features 208 of the object region so that the first sub-features 312 created from a corresponding channel may be located right after each channel of the features 208 of the object region.

Figure 5:
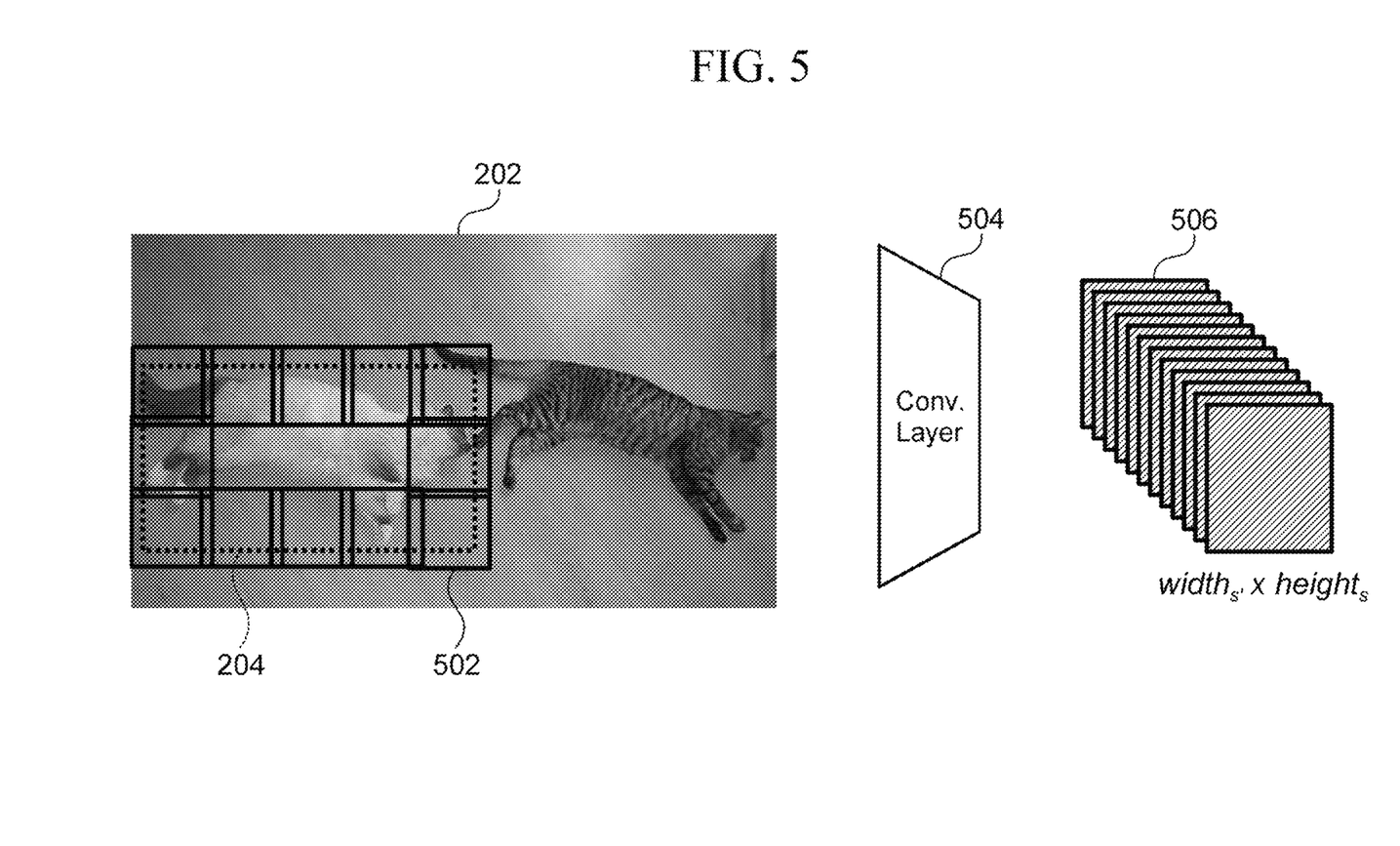
FIGS. 5 to 8 are views showing an example of creating an attention matrix and creating a training data therefrom by a second training data creator according to an embodiment.

Like this, the first training data creator 106 may prevent important information in an object from being disappeared in the training process by considering the first sub-features 312 created from the sub-regions configuring the object region 204, together with the features 208 of the entire object region 204. In addition, the object detection model may learn the relation among the sub-regions in the object region 204 owing to the configuration described above and may learn even a sentence label corresponding to the image, in addition to the image itself, by reflecting the sentence label embeddings 308 to the first sub-features 312 created from the object region 204. Returning to FIG. 1 again, next, the second training data creator 108 extracts a plurality of second sub-regions 502 along the bounding surface of the object region 204, creates an attention matrix from the second sub-regions 502, and creates a training data by applying the attention matrix to the features 208 of the object region. This will be described below in more detail.

FIGS. 5 to 8 are views showing an example of creating an attention matrix and creating a training data therefrom by the second training data creator 108 according to an embodiment. First, as shown in FIG. 5, the second training data creator 108 extracts a plurality of second sub-regions 502 along the bounding surface of the object region 204. In an embodiment, the second training data creator 108 may extract the second sub-regions 502 to include part of the outer area of the object region 204, together with the bounding surface of the object region 204, or may extract the second sub-regions 502 to include only the object region 204. In addition, the second training data creator 108 may extract the second sub-regions 502 to be overlapped or not to be overlapped with adjacent second sub-regions 502.

Then, the second training data creator 108 may create the second sub-regions 506 by applying one layer convolution 504 after adding each pixel value of the extracted second sub-regions as a channel of an input layer. At this point, the size of each channel configuring the extracted second sub-feature may be defined as ($width_s$*$height_s$).

Figure 6:
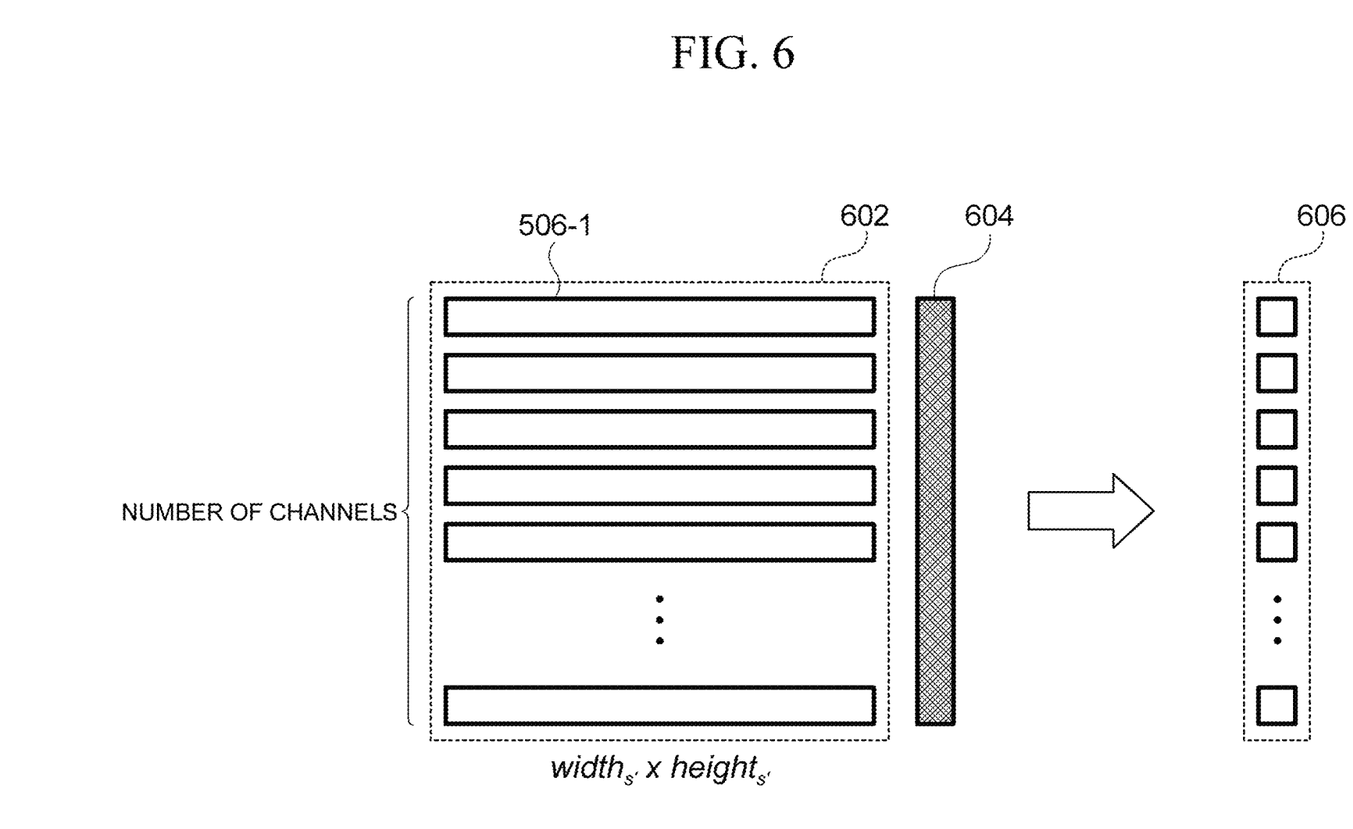

Next, as shown in FIG. 6, the second training data creator 108 converts the channels configuring the second sub-features 506 into one-dimensional vector 506-1 of a length of ($width_s$*$height_s$), and creates a second sub-feature matrix 602, which is a two-dimensional matrix having a plurality of one-dimensional vectors 506-1 as a row. That is, the number of rows of the second sub-feature matrix 602 is ($width_{s'}$*$height_{s'}$), and the number of columns becomes the number of channels of the second sub-features 506.

Then, the second training data creator 108 inputs the sentence label embeddings created by the label processor 104 into the convolution layer to convert the sentence label embeddings into a size the same as the size of the second sub-features, converts the converted sentence label embeddings into one-dimensional vector 604, and creates an attention weight vector 606 through an inner product between the second sub-feature matrix 602 and the one-dimensional vector 604. As shown in FIG. 6, the number of elements configuring the attention weight vector 606 is the same as the number of channels of the second sub-features 506.

Figure 7:
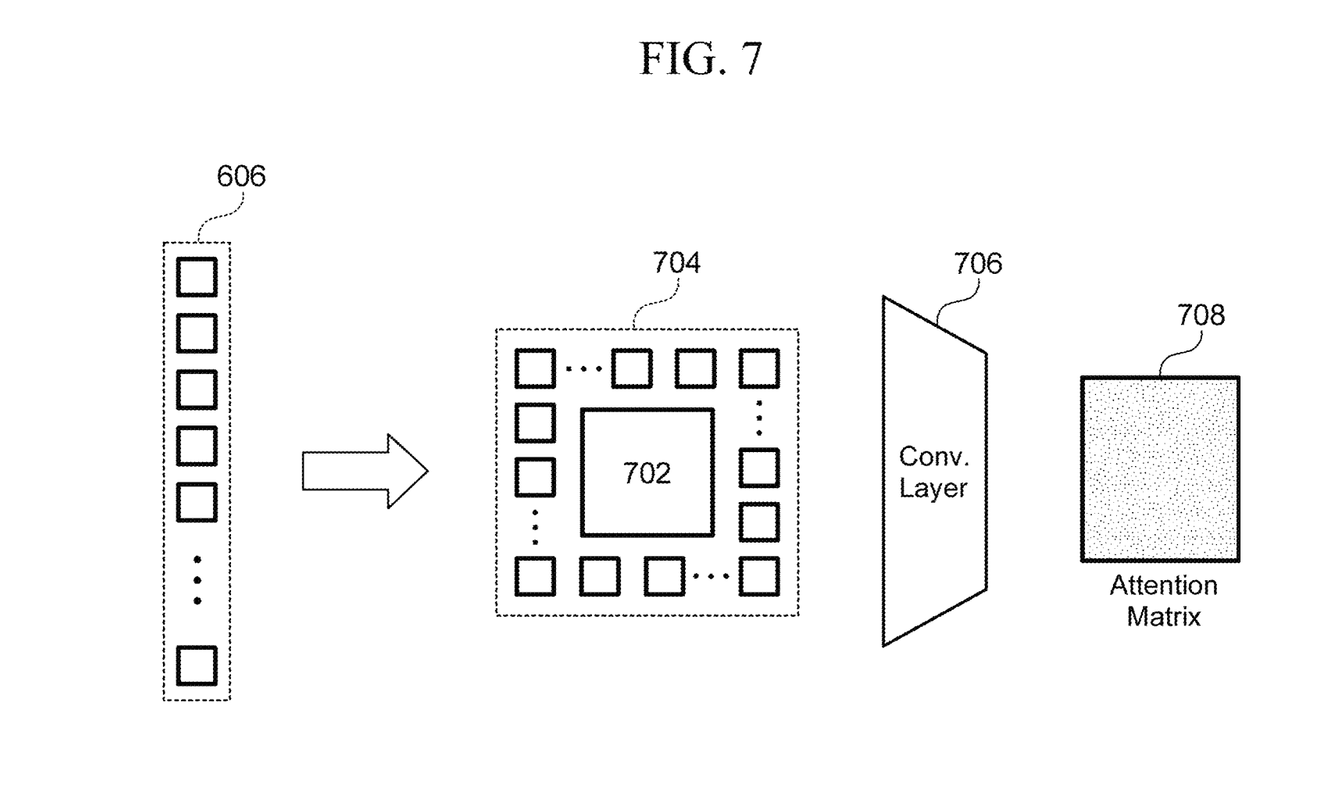

Next, the second training data creator 108 creates an attention matrix using the attention weight vector 606. First, the second training data creator 108 configures a two-dimensional matrix 702, in which the value of each element is 1 and the size of the matrix is [(C/4)−1*(C/4)−1] (at this point, C is the number of channels of the second sub-features 506), and pads the attention weight vector in the outer area of the two-dimensional matrix 702 as shown in FIG. 7. In the disclosed embodiments, when the size of the two-dimensional matrix 702 is (M, N), the outer area of the two-dimensional matrix 702 means an area on the left side of the first column of the matrix (M, N), an area on the right side of the N-th column, an area above the first row, and an area below the M-th row. That is, when the outer area of the two-dimensional matrix 702 is padded with the attention weight vector, the size of the attention matrix created from this becomes (M+2, N+2). The second training data creator 108 may pad each element of the attention weigh vector considering the extraction location of the second sub-region 502. For example, when a specific element of the attention weight vector is originated from a second sub-region extracted from the left-top of the object region 204, the specific element may be padded to be located at the left-top on the attention matrix. Next, the second training data creator 108 creates an attention matrix 708 by applying a convolution layer 706 to the two-dimensional matrix 704 padded with the attention weight vector. The size of the created attention matrix 708 at this point is the same as the size of each channel (widthf * heightf) extracted from the object region 204.

Figure 8:
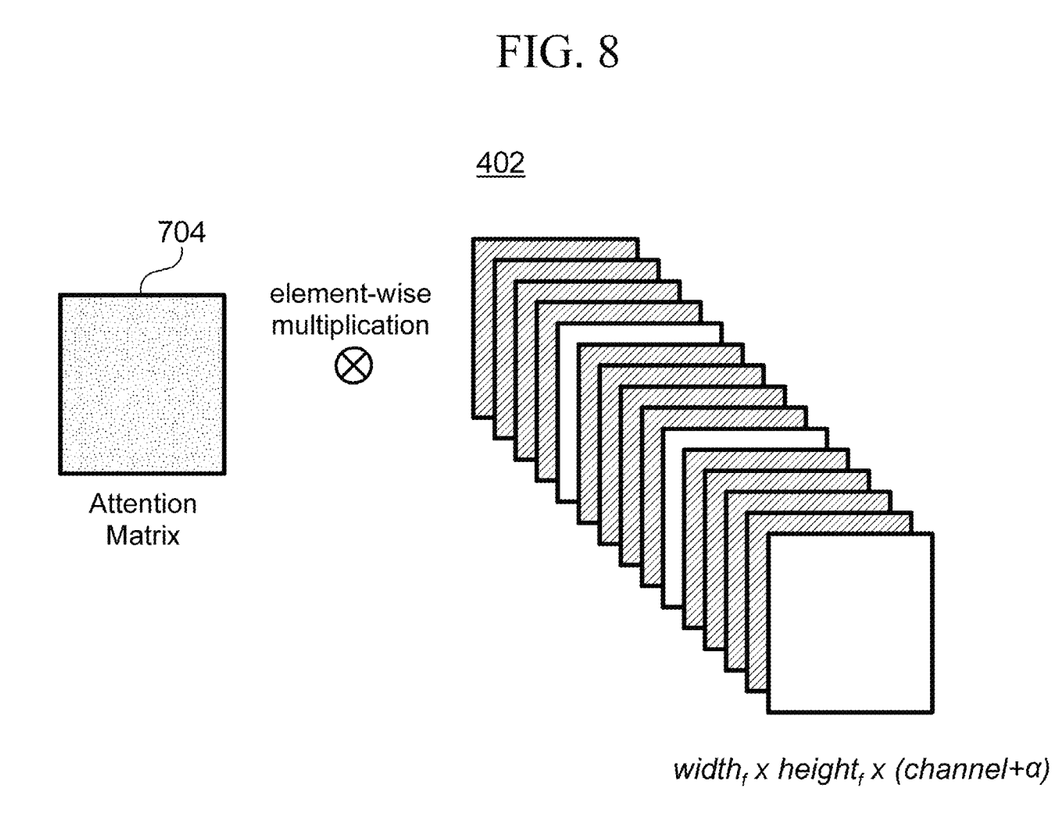

Finally, as shown in FIG. 8, the second training data creator 108 creates a final training data through an element-wise multiplication between each channel of the first training data 402 and each element of the attention matrix.

Returning to FIG. 1 again, the trainer 110 trains the object detection model by using the training data created through the first training data creator 106 and the second training data creator 108. In an embodiment, the trainer 110 may train the object detection model by using a loss function considering the Intersection Over Union (IOU) and the distance between the features of the training data, which is created from an object region predicted by the object detection model from a training target image, and the features of a ground truth data (GT). At this point, the loss function may be calculated as shown below in Equation 1.

$$L_D = \frac{1}{N_{reg}} \sum_i f_{IOU}\left(\frac{d_i}{\sum_i d_i}\right) L(\{p_i\}, \{t_i\})$$ [Equation 1]

$$f_{IOU}(k) = f(x) = \begin{cases} \left|\log\left(\frac{k * \sum_i IOU_i}{IOU_i} + 1\right)\right|, & IOU_i > 0 \\ |\log(k-1)|, & IOU_i = 0 \end{cases}$$

At this point, LD denotes a loss, $N_{reg}$ denotes the number of anchors in an image, $d_i$ denotes the distance between the features of the i-th anchor and the features of the GT, $p_i$ denotes a predicted probability of the i-th anchor, ti denotes a predicted bounding box, $IOU_i$ denotes IOU between the features of the i-th anchor and the features of the GT, and L({$p_i$}, {$t_i$}) denotes a loss function used in Region Proposal Networks (RPNs).

The trainer 110 may perform training to minimize the loss function described above. As is known from the Equation 1, to make a smooth loss function, a Gaussian filter is applied to (relative distance/IOU) when the IOU is larger than 0, and a negative loss is applied when the IOU is equal to 0 to make the relative distance longer. The loss function like this acts as a kind of weight function to map the sentence label embeddings in a space the same as that of the object region by using the distance between objects, rather than the purpose of training accurate location information by minimizing the loss, and accuracy of actual location information can be obtained through an existing loss function (L({pi}, {ti})). When a plurality of objects exists in an image, the trainer 110 applies an fiou function through an One-vs-the-Rest method.

Figure 9:
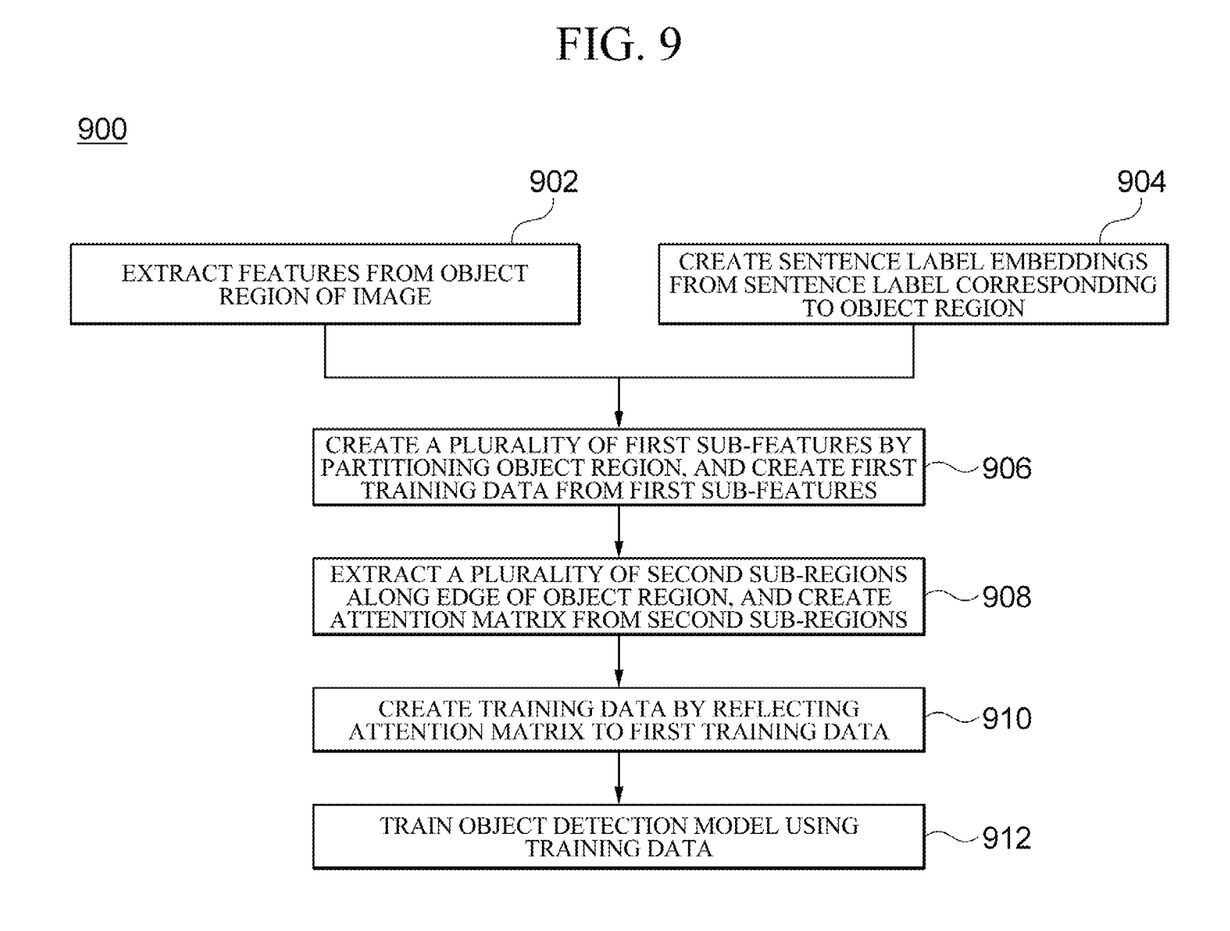
FIG. 9 is a flowchart illustrating a machine learning method for object detection according to an embodiment.

FIG. 9 is a flowchart illustrating a machine learning method 900 for object detection according to an embodiment. The flowchart shown in the figure may be executed by a computing device including one or more processors and a memory for storing one or more programs executed by the one or more processors, for example, the image classification apparatus 100 described above. Although the method or the procedure is described as being divided in a plurality of steps in the flowchart shown in the figure, at least some of the steps may be performed in a different order or in combination and together with the other steps, omitted, divided into detailed steps, or performed in accompany with one or more steps not shown in the figure.

At step 902, the feature extractor 102 extracts features from an object region of an image.

At step 904, the label processor 104 creates sentence label embeddings from a sentence label corresponding to the object region. Step 904 may be performed before or after step 902 or together with step 902.

At step 906, the first training data creator 106 creates a plurality of first sub-features by partitioning the object region and creates a first training data from the first sub-features. Specifically, the first training data creator 106 creates the first training data by extracting the first sub-features from the plurality of first sub-regions created by partitioning the object region, adding the sentence label embeddings to the extracted first sub-features, and adding the first sub-features added with the sentence label embeddings to the features of the object region.

At step 908, the second training data creator 108 extracts a plurality of second sub-regions along the bounding surface of the object region, and creates an attention matrix from the second sub-regions.

At step 910, the second training data creator 108 creates a training data by applying the attention matrix to the features of the object region.

At step 912, the trainer 110 trains the object detection model using the training data.

Figure 10:
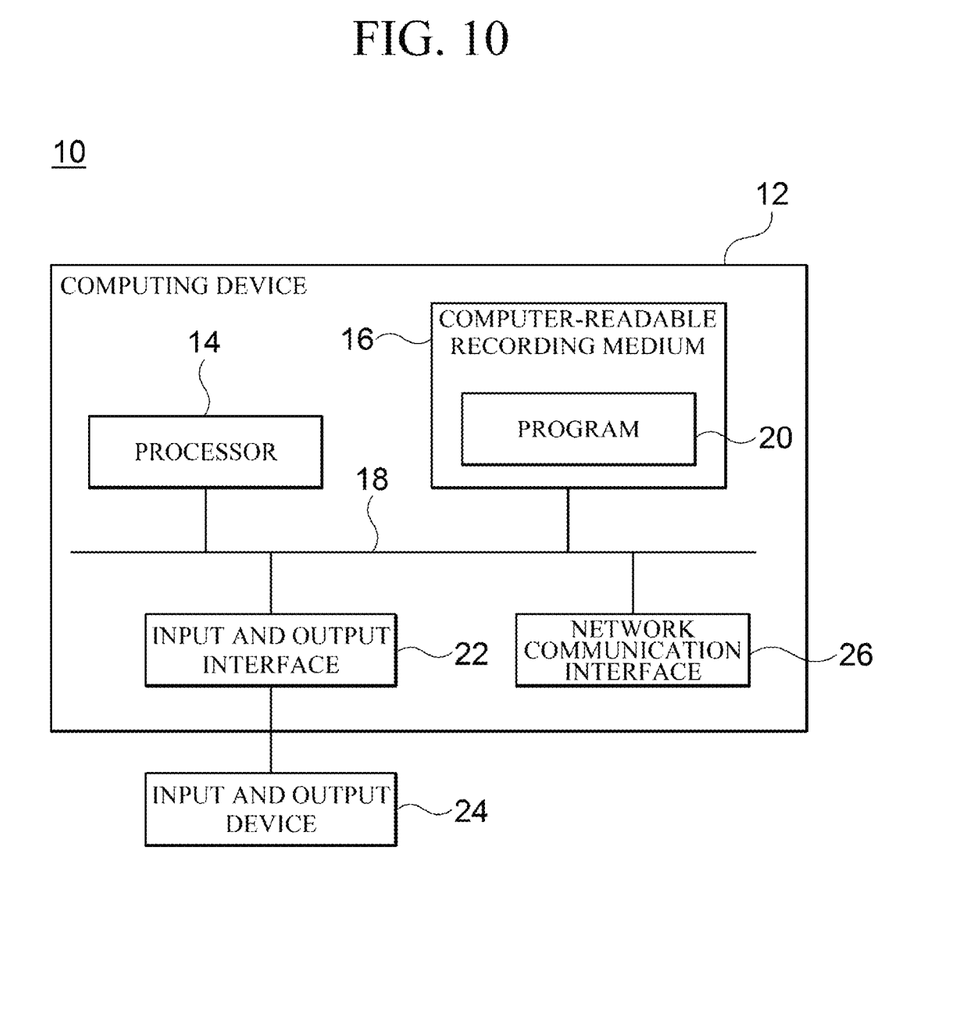
FIG. 10 is a block diagram showing an example of a computing environment including a computing device appropriate to be used in exemplary embodiments.

FIG. 10 is a block diagram showing an example of a computing environment 10 including a computing device appropriate to be used in exemplary embodiments. In the embodiment shown in the figure, each of the components may have a different function and ability in addition to those described below, and additional components other than those described below may be included.

The computing environment 10 shown in the figure includes a computing device 12. In an embodiment, the computing device 12 may be a machine learning apparatus according to the embodiments of the present invention. The computing device 12 includes at least a processor 14, a computer-readable storage medium 16, and a communication bus 18. The processor 14 may direct the computing device 12 to operate according to the exemplary embodiments described above. For example, the processor 14 may execute one or more programs stored in the computer-readable storage medium 16. The one or more programs may include one or more computer executable commands, and the computer executable commands may be configured to direct the computing device 12 to perform operations according to the exemplary embodiment when the commands are executed by the processor 14.

The computer-readable storage medium 16 is configured to store computer-executable commands and program codes, program data and/or information of other appropriate forms. The programs 20 stored in the computer-readable storage medium 16 include a set of commands that can be executed by the processor 14. In an embodiment, the computer-readable storage medium 16 may be memory (volatile memory such as random access memory, non-volatile memory, or an appropriate combination of these), one or more magnetic disk storage devices, optical disk storage devices, flash memory devices, other forms of storage media that can be accessed by the computing device 12 and is capable of storing desired information, or an appropriate combination of these.

The communication bus 18 interconnects various different components of the computing device 12, including the processor 14 and the computer-readable storage medium 16.

The computing device 12 may also include one or more input and output interfaces 22 and one or more network communication interfaces 26, which provide an interface for one or more input and output devices 24. The input and output interfaces 22 and the network communication interfaces 26 are connected to the communication bus 18. The input and output devices 24 may be connected to other components of the computing device 12 through the input and output interfaces 22. Exemplary input and output devices 24 may include input devices such as a pointing device (a mouse, a track pad, etc.), a keyboard, a touch input device (a touch pad, a touch screen, etc.), a voice or sound input device, various kinds of sensor devices and/or photographing devices, and/or output devices such as a display device, a printer, a speaker and/or a network card. The exemplary input and output devices 24 may be included inside the computing device 12 as a component configuring the computing device 12 or may be connected to the computing device 12 as a separate apparatus distinguished from the computing device 12.

Meanwhile, the embodiments of the present invention may include programs for performing the methods described in this specification on a computer and computer-readable recording media including the programs. The computer-readable recording media may store program commands, local data files, local data structures and the like independently or in combination. The media may be specially designed and configured for the present invention or may be commonly used in the field of computer software. Examples of the computer-readable recording media include magnetic media such as a hard disk, a floppy disk and a magnetic tape, optical recording media such as CD-ROM and DVD, and hardware devices specially configured to store and execute program commands, such as ROM, RAM, flash memory and the like. An example of the program may include a high-level language code that can be executed by a computer using an interpreter or the like, as well as a machine code created by a compiler.

Although representative embodiments of the present invention have been described above in detail, it should be understood that those skilled in the art may make diverse modifications on the embodiments described above without departing from the scope of the present invention. Therefore, the scope of the present invention should not be defined to be limited to the embodiments described above and should be defined by the claims described below and those equivalent to the claims.

The invention claimed is:

1. A machine learning apparatus comprising:
a feature extractor configured to extract features from an object region of an image;
a label processor configured to create sentence label embeddings from a sentence label corresponding to the object region of the image;
a first training data creator configured to extract first sub-features from a plurality of first sub-regions created by partitioning the object region of the image, add the sentence label embeddings to the extracted first sub-features, and add the first sub-features added with the sentence label embeddings to the features of the object region of the image;
a second training data creator configured to extract a plurality of second sub-regions along a bounding surface of the object region of the image, create an attention matrix from the second sub-regions, and create a training data by applying the attention matrix to the features of the object region; and
a trainer configured to train an object detection model using the training data.

2. The apparatus according to claim 1, wherein the first training data creator is further configured to extract the first sub-features by inputting the plurality of first sub-regions into a convolution layer.

3. The apparatus according to claim 2, wherein the first training data creator is further configured to input the sentence label embeddings into the convolution layer to convert the sentence label embeddings into a size the same as that of the first sub-features, and add the converted sentence label embeddings to the first sub-features.

4. The apparatus according to claim 3, wherein the first training data creator is further configured to input the first sub-features added with the sentence label embeddings into a deconvolution layer to convert the first sub-features into a size the same as that of the features of the object region, and add the converted first sub-features to the features of the object region as additional channels.

5. The apparatus according to claim 1, wherein the second training data creator is further configured to input the second sub-regions into a convolution layer to create second sub-features, and create a second sub-feature matrix, which is a two-dimensional matrix having the created second sub-features as a row.

6. The apparatus according to claim 5, wherein the second training data creator is further configured to input the sentence label embeddings into the convolution layer to convert the sentence label embeddings into a size the same as that of the second sub-features, convert the converted sentence label embeddings into an one-dimensional vector, and create an attention weight vector through an inner product between the one-dimensional vector and the second sub-feature matrix.

7. The apparatus according to claim 6, wherein the second training data creator is further configured to create the attention matrix by padding the attention weight vector in an outer area of the two-dimensional matrix, each element of which has a value of 1, considering extraction locations of the second sub-regions.

8. The apparatus according to claim 7, wherein the attention matrix is created to have a size the same as that of each channel included in the features of the object region.

9. The apparatus according to claim 1, wherein the trainer is further configured to train the object detection model using a loss function considering an Intersection Over Union (IOU) and a distance between the training data, which is created from an object region predicted from a training target image, and a ground truth data (GT).

10. A machine learning method comprising:
a step of extracting features from an object region of an image;
a step of creating sentence label embeddings from a sentence label corresponding to the object region of the image;
a first training data creation step of extracting first sub-features from a plurality of first sub-regions created by partitioning the object region of the image, adding the sentence label embeddings to the extracted first sub-features, and adding the first sub-features added with the sentence label embeddings to the features of the object region of the image;

a second training data creation step of extracting a plurality of second sub-regions along a bounding surface of the object region of the image, creating an attention matrix from the second sub-regions, and creating a training data by applying the attention matrix to the features of the object region; and a step of training an object detection model using the training data.

11. The method according to claim 10, wherein the first training data creation step extracts the first sub-features by inputting the plurality of first sub-regions into a convolution layer.

12. The method according to claim 11, wherein the first training data creation step inputs the sentence label embeddings into the convolution layer to convert the sentence label embeddings into a size the same as that of the first sub-features, and adds the converted sentence label embeddings to the first sub-features.

13. The method according to claim 12, wherein the first training data creation step inputs the first sub-features added with the sentence label embeddings into a deconvolution layer to convert the first sub-features into a size the same as that of the features of the object region, and adds the converted first sub-features to the features of the object region as additional channels.

14. The method according to claim 10, wherein the second training data creation step inputs the second sub-regions into a convolution layer to create second sub-features, and creates a second sub-feature matrix, which is a two-dimensional matrix having the created second sub-features as a row.

15. The method according to claim 14, wherein the second training data creation step inputs the sentence label embeddings into the convolution layer to convert the sentence label embeddings into a size the same as that of the second sub-features, converts the converted sentence label embeddings into an one-dimensional vector, and creates an attention weight vector through an inner product between the one-dimensional vector and the second sub-feature matrix.

16. The method according to claim 15, wherein the second training data creation step creates the attention matrix by padding the attention weight vector in an outer area of the two-dimensional matrix, each element of which has a value of 1, considering extraction locations of the second sub-regions.

17. The method according to claim 16, wherein the attention matrix is created to have a size the same as that of each channel included in the features of the object region.

18. The method according to claim 10, wherein the training step trains the object detection model using a loss function considering an Intersection Over Union (IOU) and a distance between the training data, which is created from an object region predicted from a training target image, and a ground truth data (GT).

* * * * *